J. SCHELLKOPF.
Journal-Box.

No. 168,787.

Patented Oct. 11, 1875.

WITNESSES:
A. B. Robertson.
Solon C. Kemon

INVENTOR:
Jno. Schellkopf
BY
ATTORNEYS.

UNITED STATES PATENT OFFICE.

JOHN SCHELLKOPF, OF TIDIOUTE, PENNSYLVANIA.

IMPROVEMENT IN JOURNAL-BOXES.

Specification forming part of Letters Patent No. 168,787, dated October 11, 1875; application filed September 20, 1875.

*To all whom it may concern:*

Be it known that I, JOHN SCHELLKOPF, of Tidioute, in the county of Warren and State of Pennsylvania, have invented a new and Improved Journal-Box; and I do hereby declare that the following is a full, clear, and exact description of the same, reference being had to the accompanying drawing, forming a part of this specification, in which—

Figure 1:
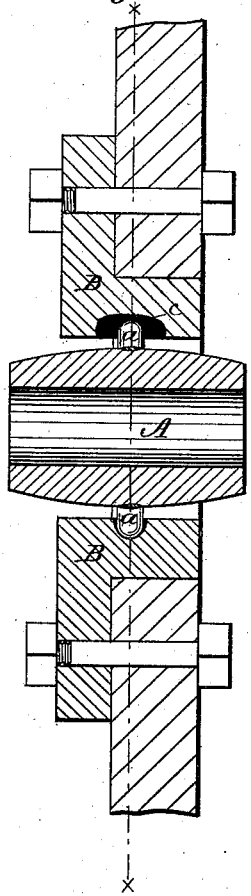
Figure 2:
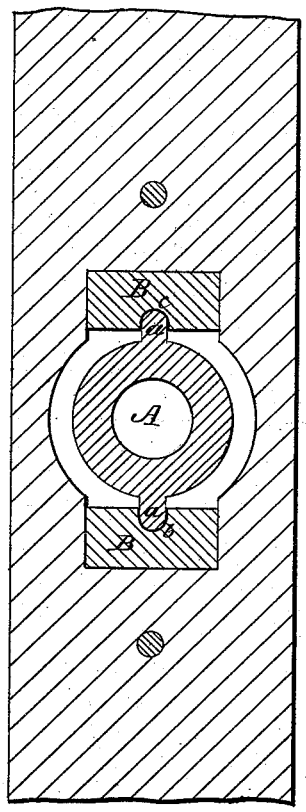
Figure 3:
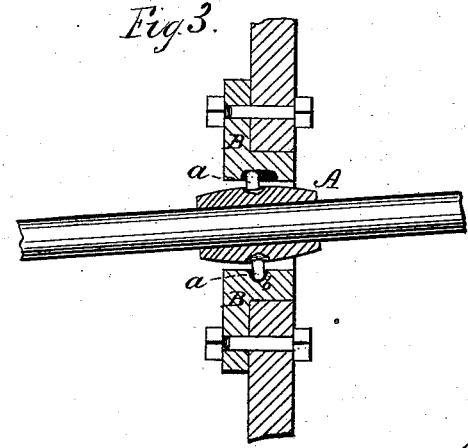

Figure 1 is a sectional view; Fig. 2, a section through line $xx$; Fig. 3, a reduced view of Fig. 1, showing the shaft in the journal-box.

The object of this invention is to provide a simple form of adjustable journal-box; and it consists in a journal-box provided with diametrically-opposite pivots, in combination with holders upon each side, one of which is provided with a socket or depression, which receives and supports one of the pivots of the journal-box, and the other of which holders is provided with an elongated depression or mortise, which receives the other pivot of the journal-box, by means of which construction the said journal-box is free to adjust itself upon its pivots as an axis, and has also an adjustment at right angles thereto, equal to the length of the mortise.

In the drawing, A represents the journal-box, provided with diametrical pivots $a\,a$, and B B are the holders, one of which has a socket or depression, $b$, which receives one of the pivots $a$, being made slightly larger than the pivot, so as to allow the latter freedom of motion. The other holder has an elongated depression or mortise, $c$, which receives the other pivot of the journal-box, and allows it a lateral motion, which gives the box an adjustment at right angles to the plane of oscillation upon its pivots.

By means of the above-described devices it will be seen that lines of shafting may be readily set up without the expenditure of time and trouble in getting them true in the boxes, and after being set up they run smoothly and wear uniformly, instead of griping and wearing unevenly, as is apt to be the case where no adjustment is employed.

In constructing my devices, I do not confine myself to any particular form of the holders B, and I may make them in two parts, and inserted in a wall-support, as shown; or they may be modified so as to adapt them to use upon hangers, or any other form of application that may be desired.

Having thus described my invention, what I claim as new is—

The journal-box A, provided on two diametrically-opposite sides with pivots $a$, in combination with holders B B, one of which is provided with a depression to receive one of the pivots, and the other with a mortise to receive the other pivot, substantially as and for the purpose specified.

JOHN SCHELLKOPF.

Witnesses:
SOLON C. KEMON,
CHAS. A. PETTIT.